(12) United States Patent
    Rump

(10) Patent No.: US 12,586,330 B2
(45) Date of Patent: Mar. 24, 2026

---

(54) DISPLAYING A VIRTUAL OBJECT IN A REAL-LIFE SCENE

(71) Applicant: X-RITE EUROPE GMBH, Regensdorf (CH)

(72) Inventor: Martin Rump, Winderscheid (DE)

(73) Assignee: X-RITE EUROPE GMBH, Regensdorf (CH)

( * ) Notice: Subject to any disclaimer, the term of this patent is extended or adjusted under 35 U.S.C. 154(b) by 90 days.

(21) Appl. No.: 18/014,973

(22) PCT Filed: Jul. 7, 2021

(86) PCT No.: PCT/IB2021/056094
    § 371 (c)(1),
    (2) Date: Jan. 6, 2023

(87) PCT Pub. No.: WO2022/009117
    PCT Pub. Date: Jan. 13, 2022

(65) Prior Publication Data
    US 2023/0260236 A1     Aug. 17, 2023

(30) Foreign Application Priority Data
    Jul. 10, 2020     (EP) ..................................... 20185290

(51) Int. Cl.
    *G09G 5/02*          (2006.01)
    *G06T 7/90*          (2017.01)
    (Continued)

(52) U.S. Cl.
    CPC ................ G06T 19/20 (2013.01); G06T 7/90 (2017.01); G06T 15/506 (2013.01);
    (Continued)

(58) Field of Classification Search
    CPC . G09G 5/02; G09G 5/06; G09G 5/363; G06T 11/001; G06T 5/20;
    (Continued)

(56) References Cited

U.S. PATENT DOCUMENTS 6,768,814 B1    7/2004  Spitzer et al.
10,049,294 B2   8/2018  Vogh, Jr. et al.
        (Continued)

FOREIGN PATENT DOCUMENTS

EP         3051793          8/2016
EP         3627449          3/2020
WO      2010125023 A1       4/2010

OTHER PUBLICATIONS

International Search Report regarding PCT/IB2021/05694, mailed Oct. 8, 2021 (4 pgs.).
        (Continued)

*Primary Examiner* — Gordon G Liu
(74) *Attorney, Agent, or Firm* — Hahn Loeser & Parks LLP

(57)                ABSTRACT

In a method for displaying a virtual object (140), a scene (100) is imaged. The scene comprises a target apparatus (120). The target apparatus comprises a set of color target elements (121) having known reflectance properties and at least one illumination target element (122) having a plurality of known surface normals. At least one image of the scene is processed to determine measured colors for the color target elements and illumination and viewing conditions for the scene. Color transformation parameters are calculated by comparing the measured colors and the known reflectance properties of the color target elements. The virtual object is rendered for the determined illumination and viewing conditions. The rendered virtual object is aligned with the scene. A color transformation is applied to the imaged scene and/or to the virtual object, and an overlay of the rendered virtual
        (Continued)

object with the imaged scene is displayed on a display device (220) in real time while the illumination and/or viewing conditions are changed.

17 Claims, 4 Drawing Sheets

(51) Int. Cl.
| | |
|---|---|
| *G06T 15/50* | (2011.01) |
| *G06T 19/00* | (2011.01) |
| *G06T 19/20* | (2011.01) |

(52) U.S. Cl.
CPC .. *G06T 19/006* (2013.01); *G06T 2207/10024* (2013.01); *G06T 2219/2004* (2013.01); *G06T 2219/2012* (2013.01)

(58) Field of Classification Search
CPC . G06T 2207/10132; G06T 2207/20036; G06T 2207/20212; G06T 2207/10024; G06T 2200/24; G06T 7/90; G06T 5/90; G06T 5/50; G06T 19/20; G06T 15/506; G06T 19/006; G06T 2219/2004; G06T 2219/2012; G06F 3/04845
USPC ........................................................ 345/591
See application file for complete search history.

(56) References Cited

U.S. PATENT DOCUMENTS

| | | | |
|---|---|---|---|
| 10,375,148 B2 | 8/2019 | Kirchner et al. | |
| 2005/0128484 A1 | 6/2005 | Rodrigues et al. | |
| 2015/0172513 A1* | 6/2015 | Noorkami | H04N 23/88 |
| | | | 348/223.1 |
| 2016/0080751 A1* | 3/2016 | Xiu | H04N 19/157 |
| | | | 375/240.02 |
| 2016/0224861 A1* | 8/2016 | Vogh, Jr. | G06V 10/56 |
| 2017/0323481 A1* | 11/2017 | Tran | H04N 23/611 |
| 2018/0205926 A1* | 7/2018 | Mogalapalli | H04N 13/128 |
| 2020/0089991 A1 | 3/2020 | Steenhoek et al. | |
| 2022/0368751 A1* | 11/2022 | Oh | H04N 19/119 |

OTHER PUBLICATIONS

Written Opinion of the International Searching Authority regarding PCT/IB2021/05694, mailed Oct. 8, 2021 (8 pgs.).

Klein G et al: 11 Simulating Low-Cost 1-15 Cameras for Augmented Reality Compositing 11, EEE Tran sa cti ons on Visualization Andcomputer Graphics, IEEE Servi ce Center, Los Alamitos, CA, US, vol. 16, No. 3, May 1, 2010 (May 1, 2010), pp. 369-380, XP011344620,.

International Search Report regarding PCT/IB2021/056094, mailed Oct. 8, 2021 (4 pgs).

Written opinion of the International Searching Authority regarding PCT/IB2021/056094, mailed Oct. 8, 2021 (8 pgs).

HENDRIK P. A. Lensch et al.: "Image-Based Reconstruction of Spatial Appearance and Geometric Detail", ACM Transactions on Graphics, vol. V, No. N, Month 2003, pp. 1-27.

* cited by examiner

| Image scene | ⌐ 511 |
| Determine illumination and viewing conditions | ⌐ 512 |
| Determine measured colors | ⌐ 513 |
| Calculate color transformation parameters | ⌐ 514 |
| Render and align virtual object | ⌐ 515 |
| Apply color transformation | ⌐ 516 |
| Display overlay of rendered virtual object and imaged scene | ⌐ 517 |
| Change illumination or viewing conditions | ⌐ 518 |

DISPLAYING A VIRTUAL OBJECT IN A REAL-LIFE SCENE

CROSS-REFERENCE TO RELATED APPLICATIONS

The present application is a US National Phase of International Patent Application serial number PCT/IB2021/056094, filed Jul. 7, 2021, entitled "DISPLAYING A VIRTUAL OBJECT IN A REAL-LIFE SCENE," currently pending; which claims priority from European Regional application No. 20185290.2, filed Jul. 10, 2020, entitled "DISPLAYING A VIRTUAL OBJECT IN A REAL-LIFE SCENE."

TECHNICAL FIELD

The present invention relates to a method for displaying a virtual object in an imaged real-life scene, to a system that is configured to carry out the method, and to a corresponding computer program.

PRIOR ART

It is often desirable to find a material whose visual appearance exactly matches the visual appearance of a material of an existing sample object. For instance, when a vehicle needs to be repaired in a body shop, it may be desirable to find a paint coating for a replacement body part whose visual appearance exactly matches the visual appearance of the original paint coating on the remaining vehicle body. Even if a paint code of the original paint coating or a Vehicle Identification Number of the vehicle is known, the corresponding paint may not be available any more. Sometimes, a reference recipe for the original paint is available. However, merely mixing a paint according to the reference recipe may not yield an acceptable match. This is because the appearance of the original paint coating will vary slightly from batch to batch, formulator to formulator, or year to year. The challenge then is to define an amended paint recipe that causes the appearance of the paint coating on the replacement body part to perfectly match the appearance of the original paint coating on the remaining vehicle body.

It is known to use a so-called fan deck to find a material that matches the appearance of a material of a sample object. A fan deck is a collection of sample sheets with known colors. The sample sheets in the fan deck are compared to the sample object, and a suitable candidate material is selected on this basis. However, a fan deck is not always available in the field. Even if a fan deck is available, it may happen that none of the colors in the fan deck achieves an acceptable match.

The task of defining the composition of a material of a trial object such that its appearance exactly matches the appearance of a material of a physically tangible sample object is further complicated by the fact that the sample object may have gonioapparent properties, i.e., the appearance of the sample object may depend on the illumination and viewing directions. For instance, some modern car paints exhibit a color flop when the illumination or viewing directions change. "Color flop" is a change in the color value, hue or chroma in the appearance of a material when illumination and viewing directions change. Other examples of materials having gonioapparent properties are materials that contain effect pigments like metallic flakes, which create a sparkle effect, or interference flakes, which create a pearlescent effect, and materials that have a non-planar surface microstructure. In such cases, it may not be sufficient to just match colors. Rather, entire appearances need to be matched, including angle-dependent color and texture.

It is known to describe the appearance of objects in terms of a plurality of appearance attributes, e.g., one or more of color, gloss, sparkle grade, coarseness etc. It is further known to measure appearance attributes of a sample object using a dedicated appearance capture device. Different types of appearance capture devices are known in the art. The type of device that is best suited for the task strongly depends on the circumstances, in particular, on the type of sample object. For instance, a different type of capture device may be best suited for determining appearance attributes of a body part of a vehicle than for a piece of fabric or for a translucent sample object. Known appearance capture devices include highly sophisticated stationary multi-angle appearance capture devices like the TAC7 device available from X-Rite Inc., Grand Rapids, MI (USA), integrating sphere spectrophotometers like the stationary Ci7800 device or the handheld Ci64 device available from X-Rite, and handheld multi-angle spectrophotometers with or without imaging capabilities, e.g., the imaging multi-angle spectrophotometer MA-T12 available from X-Rite. Once appearance attributes of the sample object have been measured, a recipe for a candidate material can be determined whose appearance attributes are expected to best match the measured appearance attributes of the sample object, using paint formulation software. For instance, in the case of a replacement body part of a vehicle, a recipe for a candidate paint can be determined whose appearance attributes are expected to closely match the measured appearance attributes of the existing paint coating on the vehicle body, and a replacement body part can be coated with this paint.

However, dedicated appearance capture devices are not always available in the field. Furthermore, even if appearance attributes of the sample object have been measured by a dedicated appearance capture device, the number of measured appearance attributes is generally limited, and this limited number of appearance attributes may not always fully define the actual appearance of the sample object. It is therefore not always possible to reliably predict how well the actual appearance of a trial object will match the appearance of the sample object. There is therefore a risk that trial objects are produced whose appearance does not match the appearance of the sample object sufficiently well, and that these trial objects subsequently have to be discarded, causing undesired waste and associated costs.

In other applications, it may not be necessary to exactly match the appearance of a trial object to the appearance of an existing object, but it may already be sufficient to be able to simply explore the expected visual appearance of a trial object in a real-life environment. For instance, the trial object may be a new product that has not yet been produced, e.g., a toaster, and it may be desirable to explore how the product will look in a certain environment, e.g., on a certain table, before the product is actually produced.

US20200089991A1 discloses a system for displaying one or more images to select one or more matching formulas to match appearance of a target coating of an article. A first database contains repair formulas and associated appearance characteristics. A second database contains identification information or three-dimensional geometric data of at least one article. A preliminary matching formula is retrieved from the first database, an article or its three-dimensional geometric data is selected from the second database, and a marked section of the surface of the article is received. Individual matching images containing the marked section and an unmarked section adjacent to the marked section are generated, and the individual matching images are displayed on a display device. In the marked section, the individual matching images are generated based on the appearance characteristics of the preliminary matching formula. In the unmarked section, the individual matching images are generated based on the appearance characteristic of the article. The appearance characteristics can be computed from images acquired from the article using an imaging device. However, a suitable imaging device is not always available.

U.S. Pat. No. 10,375,148 B2 discloses a method of selecting the most probable variant of a matching paint candidate color standard for vehicle repair using a mobile device having a color display and an input unit. In a first step, identification criteria associated with the color of the vehicle are entered into the mobile device. This can involve acquiring a digital image of the vehicle to extract information such as car make or color group. The identification criteria are sent to a central computer comprising a color database. Software on the central computer selects one or more candidate color standards matching the entered identification criteria and sends information about these candidate color standards to the mobile device. The information is displayed on the mobile device. One or more physical chips painted with the candidate color standards are visually compared with the color of the vehicle to be repaired. A matching color standard is selected. The selection is inputted into the mobile device and transmitted to the central computer. The software identifies variants of the selected candidate color standard, and characterizations of the variants are transmitted to the mobile device and are displayed. The best matching variant is selected and transmitted to the central computer. The software returns a corresponding paint formula. Displaying information about the candidate color standards may involve displaying images of the candidate color standards on the color display of the mobile device. The user may then visually compare the images with the color of the vehicle to be repaired. In order for this comparison to be meaningful, the display needs to have a large gamut, large dynamic range and a very high degree of color fidelity. Such displays are expensive and are often not available in the field. Moreover, lighting and viewing conditions need to be known with high precision, because the perceived color of the sample object will depend on both.

WO 2010/125023 A1 discloses a method of displaying an image of an effect coating having texture and color properties. The method can be used for selecting candidate coatings having properties that match the properties of a target coating. To this end, the document suggests displaying an image of the target coating together with an image of at least one candidate coating. This method suffers, however, from the inevitable color distortion introduced by the camera that is used to capture the image of the target coating.

U.S. Pat. No. 10,049,294 B2 (family member of EP3051793A1) discloses a method for determining color transformation parameters. A target apparatus is placed in a scene to be imaged. The target apparatus comprises, on the one hand, a set of color target elements having known colors, and on the other hand, at least one illumination target element having a plurality of different known surface normals. An image of the scene is taken. A partial environment map of global illumination of the scene is established, using the imaged illumination target element, and the colors of the color target elements are captured. Based on the known colors of the color target elements and on the partial environment map of global illumination, the expected colors of the color target elements in the image are determined. Color transformation parameters are calculated, based on differences between the expected colors and the captured colors. The color transformation can then be applied to an imaged sample surface. This process can be repeated across a plurality of different illumination or viewing conditions to estimate a reflectance model for the sample surface. The document is silent about the visual evaluation of differences between two objects.

H. P. A. Lensch et al., "Image-Based Reconstruction of Spatial Appearance and Geometric Detail", ACM Transactions on Graphics, Vol. 22, No. 2, April 2003, pages 234-237 discloses an image-based method of reconstructing the appearance of a sample object. Different materials of the object are detected, and an average bidirectional reflectance distribution function (BRDF) is fitted to each material. A plurality of reflecting steel spheres are placed in the scene to determine the position of the light source. The document is only concerned with reconstructing the appearance of the sample object. It is silent about the prediction or evaluation of visual differences between two objects.

U.S. Pat. No. 6,768,814 B1 discloses a method for determining a color formula for matching a selected color. An electronic imaging device is calibrated by measuring the color signal of at least two calibration colors having known colorimetric data. The selected color is measured using the imaging device. Using a mathematical model, parameters are calculated for converting the measured color signals of the calibration colors to their known colorimetric data. Using the mathematical model and the calculated parameters, the color signals of the measured selected color are converted to colorimetric data. Using a databank, the color formula is determined of which the colorimetric data most closely matches the calculated colorimetric data of the measured selected color. The document is silent about the prediction or evaluation of visual differences between two objects.

US 2005/0128484 A1 discloses a method for determining a color-matched repair paint formula. Color characteristics of a target color to be matched are identified, inputted, and processed in such way as to enable a visual display of the target color. Alternate colors are selected from a database. An alternate color may be displayed on the display in several virtual chips, each virtual chip representing a different viewing angle, or as a curved panel. Images showing flake appearance characteristics may be superimposed with the color. Color and images obtained for a plurality of aspecular angles may be interpolated to show the change in flake appearance as aspecular angle changes. The chips may be viewed in combination with the target color. The target color may be projected upon an entire imaged vehicle, and an available paint formulation may be superimposed thereon. It is desirable to obtain a more realistic impression of a target color and of an alternate color than the impression obtained by uniformly projecting the target color onto an entire imaged vehicle and superimposing the alternate color.

G. Klein et al., "Simulating Low-Cost Cameras for Augmented Reality Compositing", IEEE Transactions on Visualization and Computer Graphics, Vo. 16, No. 3, pp. 369-380 (2010) discloses Augmented Reality methods, wherein graphics is overlaid onto a live video feed. A compositing method which models the artifacts produced by a small, low-cost camera is described.

SUMMARY OF THE INVENTION

In one aspect, the present invention provides a method that enables a user to better judge the appearance of a trial object in a real-life setting before the trial object is actually produced.

The proposed method is a method of displaying a virtual object in an imaged real-life scene. The method comprises:

a) imaging the scene using an imaging device, the scene comprising a target apparatus, the target apparatus comprising a set of color target elements having known reflectance properties and a set of one or more illumination target elements having a plurality of different known surface normals relative to the color target elements;

b) processing at least one image of the scene to determine illumination and viewing conditions of the scene, using the imaged target apparatus;

c) processing at least one image of the scene to determine measured colors for the color target elements;

d) calculating color transformation parameters based on a comparison of the measured colors and the known reflectance properties of the color target elements, taking into account the determined illumination and viewing conditions;

e) rendering the virtual object for the determined illumination and viewing conditions;

f) aligning the rendered virtual object with the imaged scene;

g) applying a color transformation to the imaged scene or applying an inverse color transformation to the virtual object using the calculated color transformation parameters; and h) after application of the color transformation or inverse color transformation, displaying on a display device an overlay of at least a portion of the rendered virtual object with at least a portion of the imaged scene.

In the proposed method, a real-life scene is imaged using an imaging device such as a digital camera. The virtual object is rendered by a computer algorithm, assuming the same or similar illumination conditions as those present in the scene, and assuming the same or similar viewing conditions as those of the imaging device. The rendered virtual object is displayed on a display device in an overlay with the imaged scene. In order to ensure that the appearance of the rendered virtual object in the imaged scene can be judged with high confidence, a color transformation is applied. The color transformation takes into account the effects of the imperfections of the imaging device when capturing colors of an object. In particular, the color transformation corrects for the unknown spectral sensitivity of the imaging device and the unknown nonlinearities that are introduced by image processing in the imaging device. The color transformation may transform color values that have been determined by the imaging device (e.g., RGB values for each pixel) into corrected color values that are device-independent and are thus directly comparable to device-independent color attributes of the virtual object. The color transformation can be applied to all or a portion of the imaged scene. Alternatively, the inverse color transformation can be applied to all or a portion of the virtual object before, during or after the rendering operation. The color transformation ensures that the displayed colors of the imaged scene and the displayed colors of the rendered virtual object become directly comparable on the display device. It is thus possible to reliably judge the appearance of the virtual object in the imaged scene even if the displayed absolute colors deviate from the actual colors due to imperfections of the display device. Therefore, due to the color transformation, neither the imaging device nor the display device need to be precalibrated.

According to the present disclosure, the parameters of the color transformation as well as the illumination and viewing conditions are determined with the aid of a target apparatus. Suitable exemplary embodiments of target apparatuses and of methods for determining illumination and viewing conditions as well as color transformation parameters using such target apparatuses are disclosed in the patent document U.S. Pat. No. 10,049,294 B2, whose contents are incorporated into the present disclosure in their entirety. The target apparatus comprises, on the one hand, a set of color target elements having known reflectance properties (e.g., known parameters for a model of the BRDF of each color target element). The expected color of each color target element can therefore be calculated for arbitrary illumination and viewing conditions. The color target elements are preferably matte, i.e., they exhibit predominantly diffuse reflectance. On the other hand, the target apparatus comprises a set of one or more illumination target elements having a plurality of known surface normals relative to the color target elements. Each illumination target element is preferably glossy or semi-glossy, i.e., it exhibits considerable specular reflectance. The illumination target element preferably has neutral color; in particular, it may be black.

The set of one or more illumination target elements facilitates a determination of the illumination conditions. For instance, the illumination conditions can be determined in the form of an at least partial environment map of global illumination, using the imaged set of one or more illumination target elements, as disclosed in greater detail in U.S. Pat. No. 10,049,294 B2. As detailed in that document, the set of one or more illumination target elements may include at least one illumination target element that has a non-planar surface, which may be characterized by a known surface normal map including a plurality of different surface normals. In some embodiments, the at least one illumination target element having a non-planar surface may be a sphere or a partial sphere, in particular, a hemisphere. In some embodiments, the set of one or more illumination target elements may include a plurality of illumination target elements, each characterized by a different surface normal or different surface normal map, for example, wherein each of the plurality of illumination target elements includes a planar surface characterized by a different surface normal. In some embodiments, the set of illumination target elements may comprise two or more illumination target elements having different gloss levels.

The viewing conditions (in particular, the position of the imaging device and properties of the mapping of the scene to the image, including scale and any distortions) can be determined from comparing the geometry of an image of the target apparatus to the known geometry of the target apparatus. In order to facilitate a determination of the viewing conditions, the target apparatus may comprise one or more alignment markers, as they are well known in the art, and/or a distortion target element that facilitates an image-based determination of distortions (e.g., a distortion target element having a checkerboard pattern).

The color transformation parameters can be determined using the measured colors of the color target elements. To this end, the expected colors of the color target elements in the image can first be calculated, based on the known reflectance properties of the color target elements and, in case of an appreciable dependence of the reflectance properties on the illumination and viewing angle, accounting for the determined illumination conditions (e.g., the partial environment map of global illumination) and viewing conditions. Next, the color transformation parameters can be determined, based on differences between the calculated expected colors and the measured colors of the color target elements.

It should be noted the present disclosure is not limited to using the embodiments of color target elements disclosed in U.S. Pat. No. 10,049,294 B2. For instance, the target apparatus may additionally comprise filters as disclosed in U.S. Pat. No. 9,823,131 B2 and/or a reflectance reference chart as disclosed in US 2013/0093883 A1.

Alignment of the rendered virtual object with the imaged scene, such that the virtual object appears to keep its position within the scene even when the viewing direction changes, is readily carried out based on the location of the target apparatus in the image of the scene, as it is well known in the art. This task is particularly straightforward if the rendered virtual object is displayed in the imaged scene at the position of the target apparatus.

In advantageous embodiments, the scene comprises at least one sample object, for instance, for the purpose of directly comparing the visual appearance of the rendered virtual object to the visual appearance of the imaged sample object. The sample object may have a non-planar surface portion. In such embodiments, it is advantageous if a non-planar surface portion of the virtual object is displayed adjacent to a non-planar surface portion of the sample object. By simultaneously displaying non-planar surface portions of the sample object and the virtual object, a more realistic impression of the appearances of the sample object and the rendered virtual object are obtained. This is especially true if one or both of the surfaces exhibit effects that depend on the illumination direction and/or viewing directions, such as color change, pearlescence, sparkle etc. In order to facilitate direct comparison of the appearances of the non-planar surface portions, the displayed non-planar surface portion of the virtual object can have a shape that corresponds to a continuous continuation of the displayed non-planar surface portion of the sample object. In other words, the sample object and the virtual object are advantageously displayed in such a manner that the sample object and the virtual object appear to seamlessly merge without any edges or kinks at the line where the objects meet on the display. In this manner, a highly realistic impression of the appearances of both objects is generated, and differences between their appearances can be readily detected.

In some embodiments, the displayed non-planar surface portion of the virtual object may have a shape that coincides with the shape of a corresponding surface portion of the sample object, apparently replacing the surface portion of the sample object, thus yielding an even more realistic impression of appearance.

The displayed non-planar surface portion of the virtual object preferably has a three-dimensional macroscopic surface geometry that is curved along at least two mutually orthogonal directions. Preferably the macroscopic surface geometry of the virtual object comprises both convex and concave portions. Preferably the macroscopic surface geometry of the virtual object has surface normals covering a large solid angle, i.e., having a large range of directions in three-dimensional space. Preferably the solid angle covered by the directions of the surface normals of the virtual object is at least 20% or even at least 50% of the solid angle of a hemisphere, i.e., it is preferably at least $0.4\pi$ sr or even at least $\pi$ sr. In this manner, effects like color shift, gloss, pearlescence, sparkle etc. can be simultaneously compared between the sample object and the virtual object for a large number of illumination and viewing directions relative to the surface normals of the virtual object.

The impression becomes even more realistic if the displayed non-planar surface portion of the virtual object has a closed perimeter and is displayed in such a manner that it is surrounded by the displayed non-planar surface portion of the sample object along its entire closed perimeter. In this situation it is preferred that the displayed surface portion of the virtual object has a shape that corresponds to a continuous continuation of the displayed surface portion of the sample object along its entire perimeter.

It is advantageous if the target apparatus is located on a surface of the sample object. In this manner, the illumination and viewing conditions that are determined using the imaged target apparatus are likely to match the illumination and viewing conditions of the adjacent surface portions of the sample object, and the color transformation parameters are likely to adequately describe not only the applicable color transformation at the location of the target apparatus, but also at the location of the adjacent surface portions of the sample object.

Advantageously, the rendered virtual object is displayed on the display device in a position where the target apparatus is located in the imaged scene. In particular, the displayed portion of the rendered virtual object may be displayed on the display device instead of the imaged target apparatus. In this manner the displayed portion of rendered virtual object is displayed in exactly that position for which the illumination conditions and color transformation parameters have been determined. This further contributes to obtaining a realistic impression of the differences between the appearances of the rendered virtual object and the sample object.

The target apparatus may be flexible along at least one bending direction in order to be able to conform to the shape of a non-planar surface of the sample object. In order to ensure that the illumination and viewing conditions can still be determined when the target apparatus is bent, it may be advantageous to provide at least one rigid portion on the target apparatus or to ensure that the target apparatus can be bent only along one single bending direction. The target apparatus may have the shape of a flat card, on which the color target elements and the illumination target element are provided. The card may be made of an arbitrary material.

In preferred embodiments, the scene is imaged for a plurality of different illumination conditions and/or viewing conditions. The virtual object is then advantageously rendered for the plurality of different illumination conditions and/or viewing conditions, and the rendered virtual object is displayed on the display device in an overlay with the imaged scene for the different illumination conditions and/or viewing conditions. In other words, in some embodiments, the illumination conditions and/or viewing conditions are changed, and at least steps a), b), and e) to h) of the method are repeated. This can be done multiple times. In particular, the imaging device can be moved relative to the scene to image the scene from a plurality of different viewing directions. By displaying the virtual object in the imaged scene for a plurality of different illumination conditions and/or viewing conditions, an even more reliable impression of the visual appearance of the virtual object in the context of the imaged scene is obtained. This is particularly useful if the virtual object exhibits effects like a color change when the illumination or viewing conditions are changed.

In particularly preferred embodiments, at least steps a), b), and e) to g) are repeated continuously such that the rendered virtual object is displayed on the display device in an overlay with the imaged scene in the form of a continuous video stream. This is advantageously done in real time, i.e., while the illumination conditions and/or viewing conditions are changed.

The method is advantageously implemented using a computer system that cooperates with the imaging device and the display device. The method is advantageously carried out by at least one processor of the computer system, the at least one processor receiving program instructions from a corresponding computer program. In some embodiments, a mobile electronic device is employed for both imaging and displaying, the mobile electronic device comprising the imaging device and the display device. In particular, the mobile electronic device may be a mobile telephone, a tablet computer, a notebook computer, or a virtual-reality headset. In other embodiments, the imaging device and the display device may be separate units. The at least one processor that carries out the method of the present invention may include at least one processor (e.g., CPU and/or GPU) of the mobile electronic device, and/or it may include at least one processor of a separate computing device.

The display device may be a screen, e.g., an LCD screen, a projector or any other type of display device as they are well known in the art. If the display device comprises a screen, the screen may be touch-sensitive, as it is well known in the art. The display device may be capable of creating a 3D impression, as it is well known in the art. For instance, the display device may be a VR headset or a 3D display.

If the imaged scene comprises a sample object, the method may comprise retrieving appearance attributes and/ or geometric parameters indicative of a geometry of the sample object from one or more databases and rendering the virtual object using the retrieved appearance attributes and/ or three-dimensional geometric parameters.

In particular, the method may comprise:

transmitting metadata that describe the sample object to a server; and returning appearance attributes and, optionally, geometric parameters of the virtual object from the server in response to the transmitted metadata.

The virtual object may then be rendered using the returned appearance attributes and, if applicable, using the returned geometric parameters. In other embodiments, the virtual object is rendered based on appearance attributes and/or geometric parameters that have been provided in another manner, e.g., by an analysis of images taken by the image capture device.

For instance, if the imaged scene comprises a sample object which is a part of a vehicle, the metadata may comprise a Vehicle Identification Number and/or a paint identifier that identifies the paint on the sample object. In other embodiments, the metadata may comprise appearance attributes of the sample object obtained by an appearance capture device, e.g., by a multi-angle spectrophotometer. In yet other embodiments, the metadata comprise or are derived from one or more images of the sample object. The server processes the metadata and returns appearance attributes of the virtual object based on the metadata. For instance, in the case of a vehicle part, the server may return appearance attributes of a candidate paint that is expected to match the appearance of the paint on the sample object. To this end, the server may execute or access formulation software. The server may, in addition, return geometric parameters of the virtual object, based on the metadata.

In another aspect, the present invention provides a system for displaying a virtual object in an imaged real-life scene, the system being configured to carry out the method of the present invention.

In particular, the system may comprise:

a target apparatus, the target apparatus comprising a set of color target elements having known reflectance properties and at least one illumination target element having a plurality of known surface normals;

an imaging device;

a display device; and a computer system configured to carry out the method of the present invention using the imaging device and the display device.

In particular, the computer system may be configured to carry out the steps of:

a) causing the imaging device to image the scene, the scene comprising the target apparatus;

b) processing at least one image of the scene to determine illumination and viewing conditions for the scene;

c) processing at least one image of the scene to determine measured colors for the color target elements;

d) calculating color transformation parameters based on a comparison of the measured colors and the known colors of the color target elements, taking into account the determined illumination conditions;

e) rendering the virtual object for the determined illumination conditions;

f) aligning the rendered virtual object with the imaged scene;

g) applying a color transformation to the imaged scene or applying an inverse color transformation to the virtual object using the calculated color transformation parameters; and h) after application of the color transformation or inverse color transformation, causing the display device to display an overlay of at least a portion of the rendered virtual object with at least a portion of the imaged scene.

As discussed in more detail above, the computer system may be configured to cause the display device to display a non-planar surface portion of the rendered virtual object adjacent to a non-planar surface portion of a sample object in the scene, the non-planar surface portion of the rendered virtual object having a shape that corresponds to a continuous continuation of the non-planar surface portion of the sample object. As discussed in more detail above, the computer system may be configured to cause the display device to display the displayed portion of the rendered virtual object in a position where the target apparatus is located in the imaged scene. As discussed in more detail above, the computer system may be configured to repeat at least steps a), b), and e) to h) of the method, preferably continuously such that the overlay of at least a portion of the rendered virtual object with at least a portion of the imaged scene is displayed in the form of a continuous video stream, preferably in real time. As discussed in more detail above, the system may comprise a mobile electronic device, the mobile electronic device comprising the imaging device, the display device, and the processor.

In yet another aspect, the present invention provides a computer program product comprising program instructions which, when executed by at least one processor of a computer system, cause the at least one processor to carry out the method of the present invention. In particular, the instructions may cause the at least one processor to carry out the acts of:

a) causing an imaging device to image a scene that comprises a target apparatus, the target apparatus comprising a set of color target elements having known reflectance properties and at least one illumination target element having a plurality of known surface normals;

b) processing at least one image of the scene to determine illumination and viewing conditions for the scene;

c) processing at least one image of the scene to determine measured colors for the color target elements;

d) calculating color transformation parameters based on a comparison of the measured colors and the known reflectance properties of the color target elements;

e) rendering a virtual object for the determined illumination and viewing conditions;

f) aligning the rendered virtual object with the imaged scene;

g) applying a color transformation to the imaged scene or applying an inverse color transformation to the virtual object using the calculated color transformation parameters; and h) causing the display device to display an overlay of at least a portion of the rendered virtual object with at least a portion of the imaged scene.

The computer program product may comprise a non-volatile computer-readable medium on which the program instructions are stored. The non-volatile medium may include a hard disk, a solid-state drive, a memory card or any other type of physically tangible computer-readable medium as it is well known in the art.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

Figure 1:
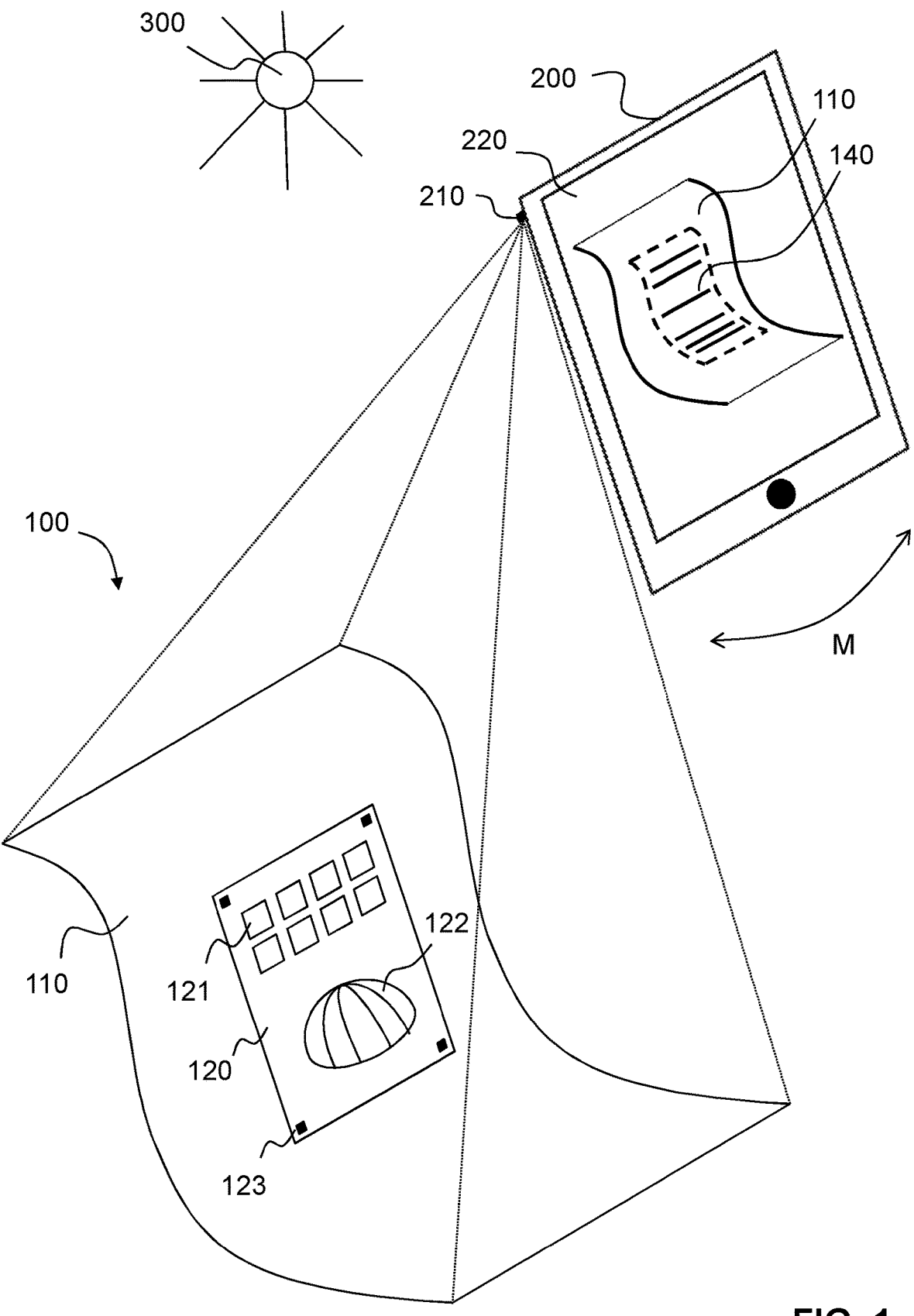
FIG. 1 shows a schematic sketch of a scene that includes a sample object and a target apparatus, together with an illuminant for illuminating the scene and a mobile electronic device for imaging the scene.

DESCRIPTION OF PREFERRED
EMBODIMENTS

Definitions

In the present disclosure, references in the singular may also include the plural. Specifically, the word "a" or "an" may refer to one, or one or more, unless the context indicates otherwise.

The term "visual appearance" or briefly "appearance" is to be understood broadly as the way in which an object reflects and transmits light, including but not limited to, how individuals viewing the object perceive color and surface texture of the object in various viewing conditions. Appear-ance also includes instrumented measurements of how an object reflects and transmits light.

One aspect of visual appearance is color. The "color" of an object is determined by the parts of the spectrum of incident white light that are reflected or transmitted without being absorbed. The color of an object can be described by "color attributes". In general terms, color attributes are indicative of the spectral response of the object when it is illuminated by incident light. In the context of the present disclosure, the term "color attribute" is to be understood broadly as encompassing any form of data that is indicative of the spectral response of an object when it is illuminated by incident light. Color attributes can take the form of color values in an arbitrary color space, e.g. in a trichromatic color space like RGB or CIEXYZ, or in any other color space like CIELAB (L*a*b*), or in the form of spectral data representative of a spectral response of a material to incident light, in arbitrary format. In the context of the present disclosure, color attributes may in particular include reflectance values and/or absorption and scattering coefficients of a material at a plurality of wavelengths.

Another aspect of visual appearance is texture. The term "texture" is to be broadly understood as referring to the spatial variation of appearance across the surface of the material, both on a microscopic or mesoscopic scale (i.e., on a scale on which individual structure elements can normally not be discerned by the naked eye) and on a macroscopic scale (i.e., on a scale on which individual structure elements can be discerned by the naked eye). Texture as understood in the present disclosure includes phenomena like coarseness, sparkle, and macroscopic variations of surface topography. Texture can be described by "texture attributes". In the context of the present disclosure, the term "texture attributes" is to be understood broadly as encompassing any form of data that is able to quantify at least one aspect of texture. Examples of texture attributes include global texture attributes such as a global coarseness parameter or a global sparkle parameter. In some embodiments, texture attributes can include a normal map or a height map. In some embodiments, texture attributes can include image data. In some embodiments, the image data can be associated with particular combinations of illumination and viewing directions. In such embodiments, the texture attributes can comprise a plurality of sets of image data, each set of image data associated with a different combination of illumination and viewing directions.

"Image data" are data that represent an image. Images include images of actual target surfaces or objects and synthesized images of virtual objects derived from one or more geometric models combined with one or more sets of appearance attributes. An image can take the form of a two-dimensional array of picture elements ("pixels"), each pixel having a pixel value. The pixel value can be representative of reflectance at the location of the pixel at a particular wavelength, averaged over a particular wavelength range, or averaged over all visible wavelengths. Accordingly, in some embodiments, image data can be provided in the form of an array of pixel values. In other embodiments, image data can be provided in compressed form or in a transformed form. A "set of image data" is a data set that comprises or consists of image data for at least one image, i.e., a data set that represents one or more images.

A "bidirectional reflectance distribution function" (BRDF) is to be understood in the usual sense as a function that defines how light is reflected at an opaque surface dependent on illumination and viewing directions, providing the ratio of reflected radiance exiting along a viewing direction to the irradiance incident on the surface from an illumination direction. If the surface exhibits spatial variations of this ratio, the BRDF is understood as providing an average of the ratio over the surface area.

An "appearance capture device" is a device that is able to determine one or more appearance attributes of an object. Depending on the appearance attributes to be determined (e.g., color attributes, texture attributes, or other attributes), an appearance capture device can take the form of, e.g., a camera, a colorimeter, a spectrophotometer, or an imaging spectrophotometer.

A "spectrophotometer" is a device for determining the reflection and/or transmission properties of a material or surface as a function of wavelength, i.e., the spectral response of an object, under illumination with visible light. Different types of spectrophotometers are known, having different geometries and being optimized for different purposes. One important type is the "integrating sphere spectrophotometer". An integrating sphere spectrophotometer comprises an "integrating sphere", i.e., a hollow spherical cavity delimited by a diffusely reflective white inner surface, having at least one entrance port for illumination and at least one exit port for observation. The integrating sphere causes a uniform scattering or diffusing effect. Light rays incident on any point on the inner surface are, by multiple scattering reflections, distributed equally to all other points. The effects of the original direction of light are minimized. Examples of integrating sphere spectrophotometers are the models Ci7860 and Ci7500 of X-Rite. Other types of spectrophotometers determine spectral information for only a single narrow range of directions of illumination, e.g., at 45° to the surface normal, and a single narrow range of directions of observation, e.g., at 0° to the surface normal. Examples include the models 962 and 964 available from X-Rite. Yet other spectrophotometers, called "goniospectrophotometers" or "multi-angle spectrophotometers", are capable of determining spectral information for a plurality of combinations of different illumination and observation directions. A spectrophotometer can additionally have imaging capabilities, i.e., it can comprise one or more cameras to take one or more digital images of an object. Examples of multi-angle spectrophotometers with imaging capabilities include the benchtop model TAC7 or the handheld models MA-T6 or MA-T12 available from X-Rite.

An "imaging device" is broadly understood as a device that is configured to capture still or moving images, such as a digital camera with or without video capture capabilities.

In the context of the present disclosure, the term "target apparatus" designates a device that comprises a set of color target elements having known reflectance properties and a set of one or more illumination target elements having a plurality of known surface normals relative to the color target elements, as described in more detail elsewhere in the present disclosure.

In the present disclosure, a virtual object is rendered and displayed. The geometry of a virtual object can be described by a three-dimensional geometric model. The three-dimensional geometric model defines a three-dimensional macroscopic surface geometry of the virtual object. The geometric model can be represented by a CAD file. Preferably the macroscopic surface geometry has at least one portion that is curved along at least two mutually orthogonal directions, preferably continuously curved along at least two mutually orthogonal directions. A surface geometry is "continuously curved" if, in mathematical terms, it corresponds at least approximately and at least locally to a two-dimensional differentiable manifold in three-dimensional Euclidean space. In some embodiments, a combination of small polygonal planar surfaces (e.g., a polygon mesh) may be used in the geometric model to represent a curved surface portion of a virtual object. In 3D computer graphics, it is well known to use a polygonal modeling as an approach for modeling objects by representing or approximating their surfaces using polygon meshes. A geometry defined by polygon meshes is considered to be continuously curved if the polygon meshes appear as a continuous surface when rendered. Preferably the curved three-dimensional macroscopic surface geometry comprises both convex and concave portions. Preferably the virtual object has surface normals covering a large solid angle, i.e., having a large range of directions in three-dimensional space. Preferably the solid angle covered by the directions of the surface normals of the virtual object is at least 50% of the solid angle of a hemisphere, i.e., it is preferably at least $1\pi$ sr. In this manner, effects like color shift, gloss, sparkle, texture etc. can be simultaneously compared between the two materials for a large number of illumination and viewing directions relative to the surface normals of the virtual object.

The term "macroscopic surface geometry" is to be understood as relating to the overall geometry of a product, excluding microscopic or mesoscopic surface structure, i.e., excluding variations of the surface geometry on a microscopic or mesoscopic scale below, e.g., 1 mm. For instance, local variations of surface height of less than, e.g., 1 mm from a local average may be considered microscopic or mesoscopic surface structure, and accordingly the macroscopic surface geometry may be equated with the surface geometry after averaging over a length scale of at least 1 mm.

"Illumination conditions" can include characteristics of the illuminant as well as a direction of illumination or a distribution of such directions. "Viewing conditions" can include viewing direction and viewing distance.

A "color transformation" transforms a first set of color attributes into a second set of color attributes. The color attributes can be color values in an arbitrary color space or spectral values. The transformation can involve a change from one color space into a different color space (e.g., from measured spectral values or RGB into a device-independent color space like CIEXYZ or CIELAB).

The term "rendering" refers to the automatic process of generating a photorealistic image of an object or a scene by means of a computer program. Input information for a rendering operation includes a 3D model of the object, a set of appearance attributes associated with the object, and information about the position and orientation of the object, the lighting conditions (which may take the form of an environment map), and the viewpoint. Many different rendering algorithms are known at different levels of sophistication, and software used for rendering may employ a number of different techniques to obtain a final image. Tracing every particle of light in a scene is often impractical, as it requires excessive computing time. Therefore, simplified techniques for modelling light transport are commonly used. One of these techniques is ray tracing.

The expression "aligning a virtual object with an imaged scene" relates to the process of determining where to place the rendered object relative to other objects in the scene. In the context of the present disclosure, the virtual object is preferably aligned with at least one reference object in the scene in such a manner that the virtual object appears not to move relative to the reference object, even if the imaging device is moved relative to the imaged scene.

The term "visualizing" encompasses rendering and displaying. For displaying, a display device is used. The term "display device" or briefly "display" is to be understood as relating to an output device of a computer for presentation of information in visual form. A display device may take the form of a computer monitor, a TV screen, a projector, a VR headset, a screen of a handheld device such as a smartphone or tablet computer etc. The display device can be a touchscreen. In some embodiments, a display device can be a "virtual light booth" as disclosed in EP 3 163 358 A1 so as to provide a particularly realistic impression of a rendered scene.

The term "database" refers to an organized collection of data that can be accessed electronically by a computer system. In simple embodiments, the database can be a searchable electronic file in an arbitrary format. Examples include a Microsoft Excel™ spreadsheet or a searchable PDF document. In more sophisticated embodiments, a database can be a relational database that is maintained by a relational database management system using a language like SQL.

The term "computer" or "computing device" refers to any device that can be instructed to carry out sequences of arithmetic or logical operations automatically via a program. Without limitation, a computer can take the form of a desktop computer, a notebook computer, a tablet computer, a smartphone, a programmable digital signal processor etc. A computer generally includes at least one processor and at least one memory device. A computer may be a subunit of another device, such as an appearance capture device. A computer may configured to establish a wired or wireless connection to another computer, including a computer for querying a database. A computer can be configured to be coupled to a data input device like a keyboard or a computer mouse or to a data output device like a display or a printer via a wired or wireless connection.

A "computer system" is to be broadly understood as encompassing one or more computers. If the computer system comprises more than one computer, these computers do not necessarily need to be at the same location. The computers within a computer system may communicate with one another via wired or wireless connections.

A "processor" is an electronic circuit which performs operations on an external data source, in particular, a memory device.

A "memory device" or briefly "memory" is a device that is used to store information for use by the processor. The memory device may include volatile memory, as for random-access memory (RAM), and nonvolatile memory, as for read-only memory (ROM). In some embodiments, the memory device may include a non-volatile semiconductor memory device such as an (E)EPROM or a flash memory device, which may take the form of, e.g., a memory card or a solid-state disk. In some embodiments, the memory device may include a mass storage device having mechanical components, like a hard disk. The memory device can store a program for execution by the processor. A non-volatile memory device may also be called a non-volatile computer-readable medium.

A "program" is a collection of instructions that can be executed by processor to perform a specific task.

A "wired connection" is a connection via an electrical conductor. A wired connection can include one or more cables. A "wireless connection" is a connection that includes the electromagnetic transfer of information between two or more points that are not connected by an electrical conductor. Wireless connections include connections via WiFi™, Bluetooth™, 3G/4G/5G mobile networks, optical communications, infrared, etc.

Imaging a Scene

FIG. 1 shows a schematic sketch of a scene 100 that includes a sample object 110 and a target apparatus 120. The scene is illuminated by a natural or artificial light source (illuminant) 300. It is imaged using a mobile electronic device 200.

The sample object 110 defines a non-planar sample surface. For simplicity, only this surface is shown in FIG. 1. The sample surface may have arbitrary shape. In the present example, the non-planar sample surface is illustrated as being curved along only one direction.

However, the sample surface may be arbitrarily curved along more than one direction. In some embodiments, the sample surface may be formed by a paint or coating on the sample object.

The target apparatus 120 comprises a plurality of color target elements 121, an illumination target element 122, and a plurality of alignment markers 123.

Each color target element 121 has predetermined, known reflectance properties. In particular, the dependence of the spectral reflectance of each color target element 121 on the directions of illumination and viewing directions is known. For instance, the parameters of a model for the BRDF of each color target element 121 are known.

The illumination target element 122 has a plurality of surface normals that vary along at least two nonparallel directions (i.e., along inclination and azimuth in polar coordinates). Its surface is glossy or at least semi-glossy, i.e., its BRDF has an appreciable specular component. In the present example, the illumination target element 121 has hemispherical shape.

For possible embodiments of the target apparatus 120, in particular, of the color target elements 121 and the illumination target element 122, reference is made to U.S. Pat. No. 10,049,294 B2. More complex color target elements may be employed, e.g., color target elements that include texture, sparkle etc.

The alignment markers 123 may be simple marks such as crosses, or they may be configured as fiducial markers as disclosed, e.g., in S. Garrido-Jurado et al., "Generation of fiducial marker dictionaries using mixed integer linear programming", Pattern Recognition 51 (2016) 481-491.

In the present example, the target apparatus 120 takes the form of a flat card. It may be flexible, allowing it to be bent along one direction. It is positioned directly on the surface of the sample object 110 and may be held on the sample surface by an adhesive or by magnetic forces.

The illuminant 300 may be any type of light source that provides a sufficiently broadband spectrum to enable different colors to be discerned. For instance, the illuminant 300 may include daylight, one or more incandescent lamps, one or more discharge lamps, one or more LEDs, etc. The illumination conditions of each object in the scene are the result of the interaction of the illuminant with the environment of the object. They may vary across the scene.

The mobile electronic device 200 includes an imaging device in the form of a digital camera 210 and a display 220. In the example of FIG. 1, the mobile electronic device 200 is a tablet computer or a smartphone, and the display is a multitouch display that serves both as an input device and an output device. In other embodiments, the mobile electronic device 200 may be a notebook computer or a VR headset with an integrated display and camera. In yet other embodiments, the camera 210 and the display 220 may be comprised in different devices. For instance, the display may be a standard LCD display of a desktop computer or the display of a notebook computer, and a separate digital camera may be connected to the desktop or notebook computer. However, it is preferred that the camera and display are comprised in a single device because a more realistic assessment becomes possible in this manner.

Hardware of Mobile Electronic Device

Figure 2:
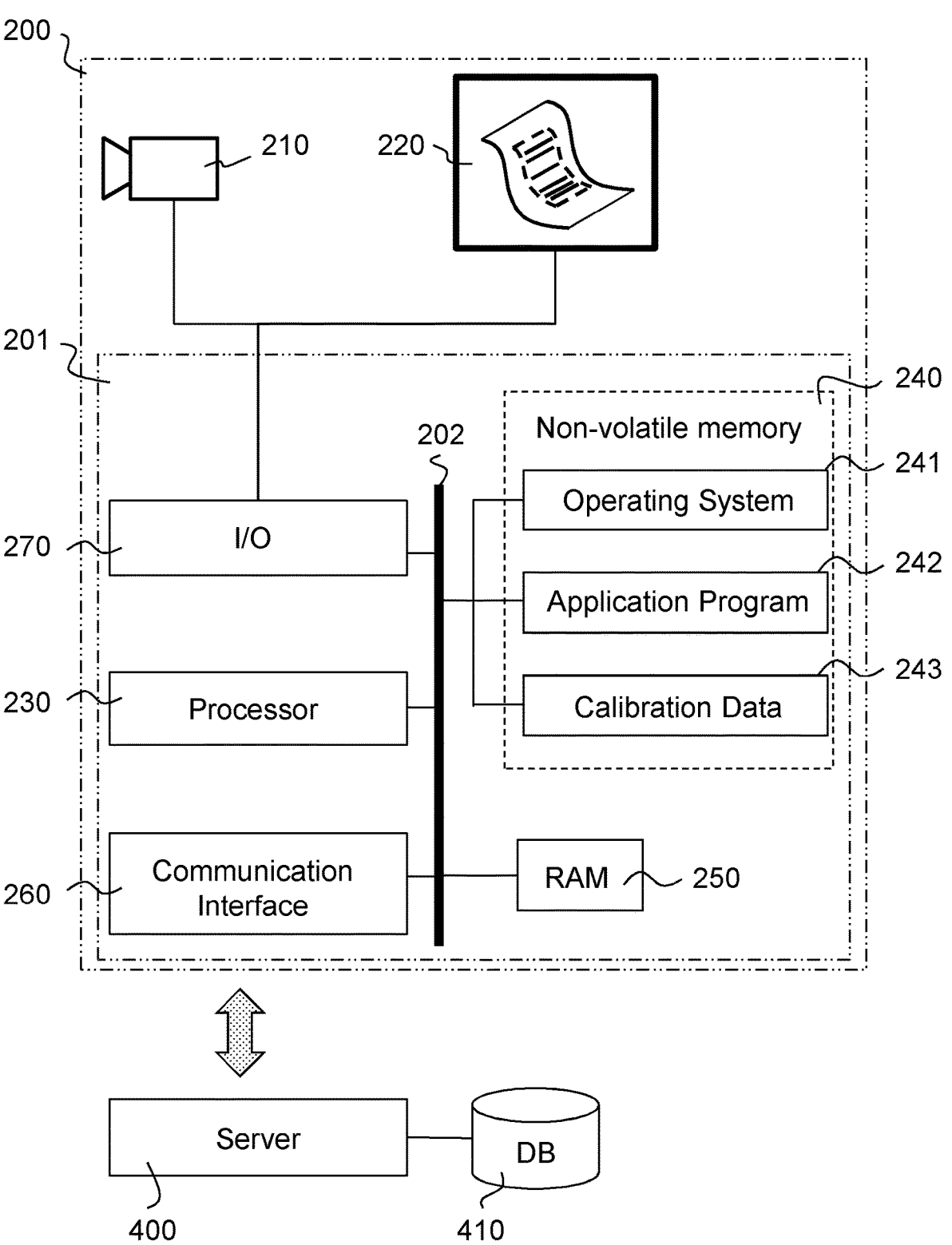
FIG. 2 shows a schematic hardware-oriented block diagram of a mobile electronic device.

FIG. 2 shows a schematic hardware-oriented block diagram of a mobile electronic device 200. The mobile electronic device comprises the camera 210 and the display 220. In addition, the mobile electronic device comprises electronic components that form a computer system 201. The various components of the computer system 201 communicate via one or more buses 202, as it is well known in the art. The computer system 201 comprises one or more processors 230. The processors 230 may comprise, for instance, a single- or multi-core CPU and a GPU, as it is well known in the art. The computer system 201 further comprises one or more non-volatile memory devices 240, such as a flash memory device and/or a hard disk drive. The non-volatile memory 240 stores, inter alia, the operating system 241 of the computer system 201 and one or more application programs 242. The non-volatile memory 240 further stores program data and user data. The data may include, inter alia, calibration data 243, as will be explained in more detail below. The computer system 201 further comprises random-access memory (RAM) 250 and a communication interface 260. The communication interface 260 may include, e.g., one or more of an Ethernet interface, a WiFi interface, a Bluetooth™ interface etc. The communication interface may serve for communication with a remote server 400, which in turn may access a database 410. Communication may take place via a wired or wireless network, e.g., via a LAN or a WAN, in particular, via the Internet. The computer system 201 further comprises an input/output interface 270 connecting to the camera 210 and the display 220.

Figure 3:
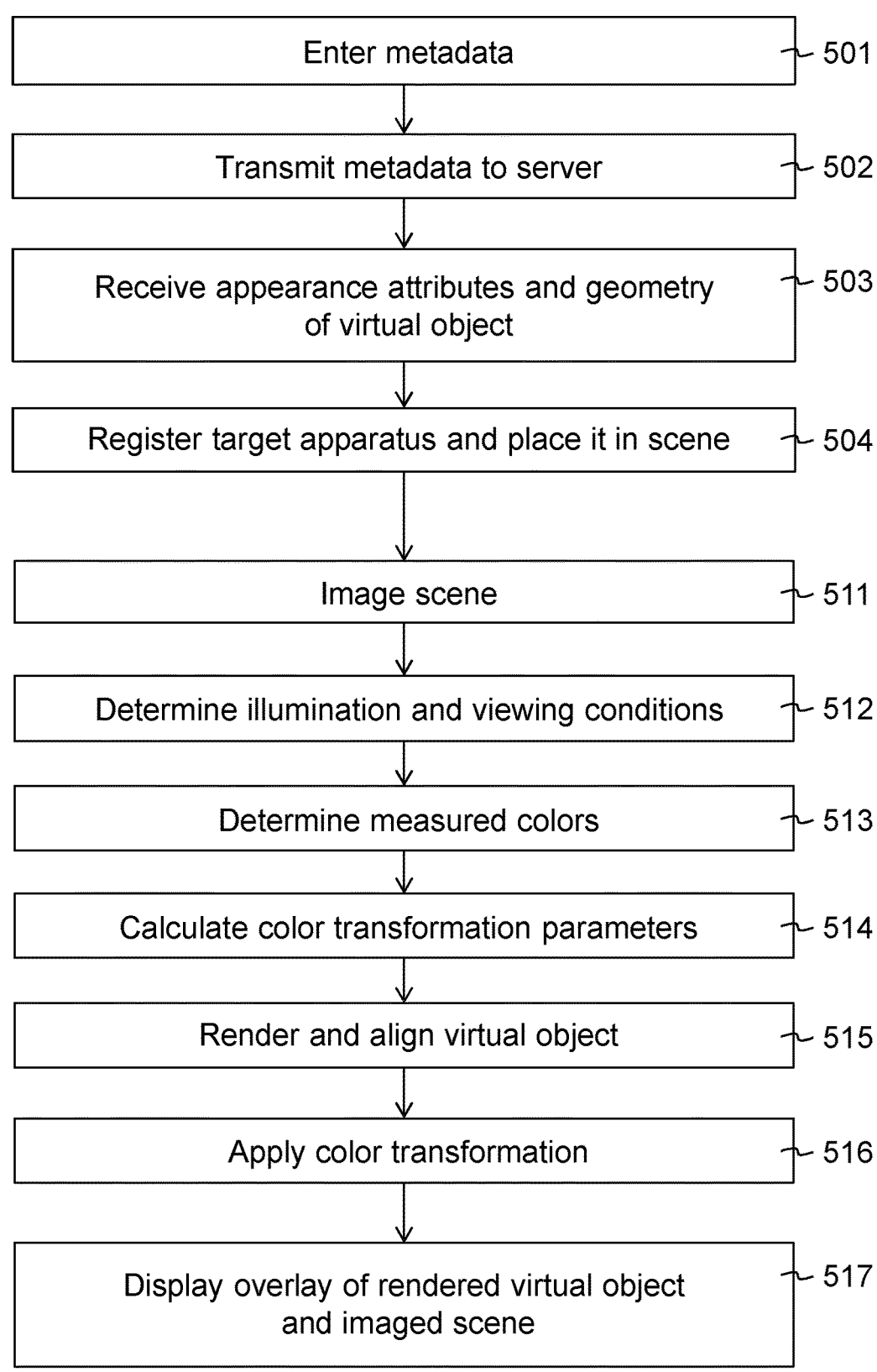
FIG. 3 shows a flow chart illustrating a method for comparing the visual appearance of a real-world sample object to the expected appearance of a virtual object according to a first embodiment.

Displaying a Virtual Object and Comparing its Visual Appearance to the Imaged Sample Object FIG. 3 illustrates an embodiment of a computer-implemented method for displaying a virtual object 140 in the imaged scene 100 so as to be able to compare an expected visual appearance of the virtual object 140 to the visual appearance of the sample object 110, using a mobile electronic device 200.

In step 501, a user enters metadata into the mobile electronic device 200, the metadata identifying and/or describing the sample object 110. For instance, if the sample object is a car part, the user may enter the Vehicle Identification Number (VIN) of the car and an identifier of the relevant car part (e.g., an identifier that specifies that the part is the right rear door). In other embodiments, the user acquires at least one image of the sample object 110 using the camera 210 of the mobile electronic device 200, and the mobile electronic device 200 derives metadata from the image of the sample object 110. In yet other embodiments, the user determines appearance attributes of the sample object 110 using an appearance capture device like a multi-angle spectrophotometer and enters these appearance attributes into the mobile electronic device 200 as metadata. These and other possibilities may also be combined to generate more detailed metadata.

In step 502, the mobile electronic device 200 transmits the metadata to server 400, using the communication interface 260. The server 400 receives the metadata and uses them to define a suitable virtual object and determine associated appearance attributes and geometric parameters, using the database 410. For instance, if the sample object is a car part coated with an existing car paint, the database may store known appearance attributes of selected car paints that have been recently offered by one or more car manufacturers, and the metadata may identify the existing car paint. The server may then return appearance attributes for the existing car paint. In alternative embodiments, the server may determine a recipe for a new candidate car paint that is expected to match the existing car paint. Color formulation algorithms for finding candidate formulas are in general known in the art. Particularly advantageous methods for finding candidate formulas are disclosed in European patent applications No. EP20184560, EP20184561, and EP20184562 filed Jul. 7, 2020, the contents of which are incorporated herein by reference in their entirety. The server may return appearance attributes for said candidate car paint. The same database or a different database may further store geometric parameters of all relevant car parts of one or more car manufacturers, e.g., in the form of CAD data, and the server may be configured to return geometric data of the car part that is identified and/or described by the metadata from the database.

In step 503, the mobile electronic device 200 receives the appearance attributes and the geometric data of the virtual object from the server 400.

In step 504, the user registers the target apparatus 120 with the mobile electronic device 200. For instance, the user may enter a unique identifier of the target apparatus 120 into the mobile electronic device 200, or he may scan a barcode or a QR code on the reverse side of the target apparatus 120, or, preferably, fiducial markers on the front side of the target apparatus are used to identify it. The mobile electronic device 200 may then retrieve calibration data for the thus-identified target apparatus 120 from a local or remote database and store them as calibration data 243 in non-volatile memory 240. The calibration data 243 may comprise, in particular, known color attributes for the color target elements 121, e.g., in the form of parameters of a BRDF model of these color target elements. The calibration data may further comprise geometric data that describe a surface normal map of the illumination target element 122 as well as reflectance data for this element, which reflectance data may again take the form of parameters of a BRDF model of the surface of the illumination target element 122. The user then places the target apparatus 120 on the sample object 110, thus creating the scene 100.

In step 511, the user images the scene 100, using the camera 210 of the mobile electronic device 200.

In step 512, the mobile electronic device 200 processes a portion of the imaged scene that contains the target apparatus 120 to determine the viewing conditions, e.g., using the alignment markers 123 and/or a distortion target element. The mobile electronic device 200 further determines the illumination conditions using the illumination target element 122, e.g., in the form of a partial environment map of global illumination. For details, reference is made to U.S. Pat. No. 10,049,294 B2.

In step 513, mobile electronic device 200 processes a portion of the imaged scene that contains the target apparatus 120 to determine measured colors of the color target elements 121.

In step 514, the mobile electronic device 200 calculates color transformation parameters, based on a comparison of the measured colors and the known reflectance properties of the color target elements 121, taking into account the illumination and viewing conditions. For details, reference is made to U.S. Pat. No. 10,049,294 B2.

In step 515, the mobile electronic device 200 renders the virtual object, using the geometric parameters and appearance attributes received in step 503, for the illumination and viewing conditions determined in step 512. It further aligns the rendered virtual object with the imaged sample object in such a manner that a surface of the rendered virtual object 140 coincides with an imaged surface of the sample object 110 when displayed on the display 220.

In step 516, the mobile electronic device 200 applies a color transformation to the image of the scene 100, using the color transformation parameters determined in step 514. For details, reference is again made to U.S. Pat. No. 10,049,294 B2. As a result of the color transformation, the image is now represented by device-independent color values that have been corrected for, e.g., the non-linear radiometric response and the unknown spectral sensitivity of the camera 210.

In step 517, portions of the imaged sample object 110 and of the rendered virtual object 140 are displayed together as an overlay on the display 220 (see FIG. 1). As illustrated in FIG. 1, the displayed portion of the rendered virtual object 140 may be displayed in such a manner that it replaces the imaged target apparatus 120 on the display 220 and is fully surrounded by the displayed portion of the imaged sample object 110 along its entire perimeter. Since the surface geometry of the virtual object 140 coincides with the surface geometry of the sample object 110, the displayed portion of the rendered virtual object 140 seamlessly blends into the displayed portion of the imaged sample object 110.

Augmented-Reality Setting

In some embodiments, the scene is imaged for a plurality of different illumination conditions and/or viewing conditions. In particular, the mobile electronic device 200 is moved relative to the scene to image the sample object 110 from a plurality of different viewing directions. By obtaining image data from the sample object 110 and rendering the virtual object 140 at different viewing angles, the scene when rendered with the virtual object will provide a more reliable impression of the visual appearance of the virtual object in the context of the imaged scene.

Figure 4:
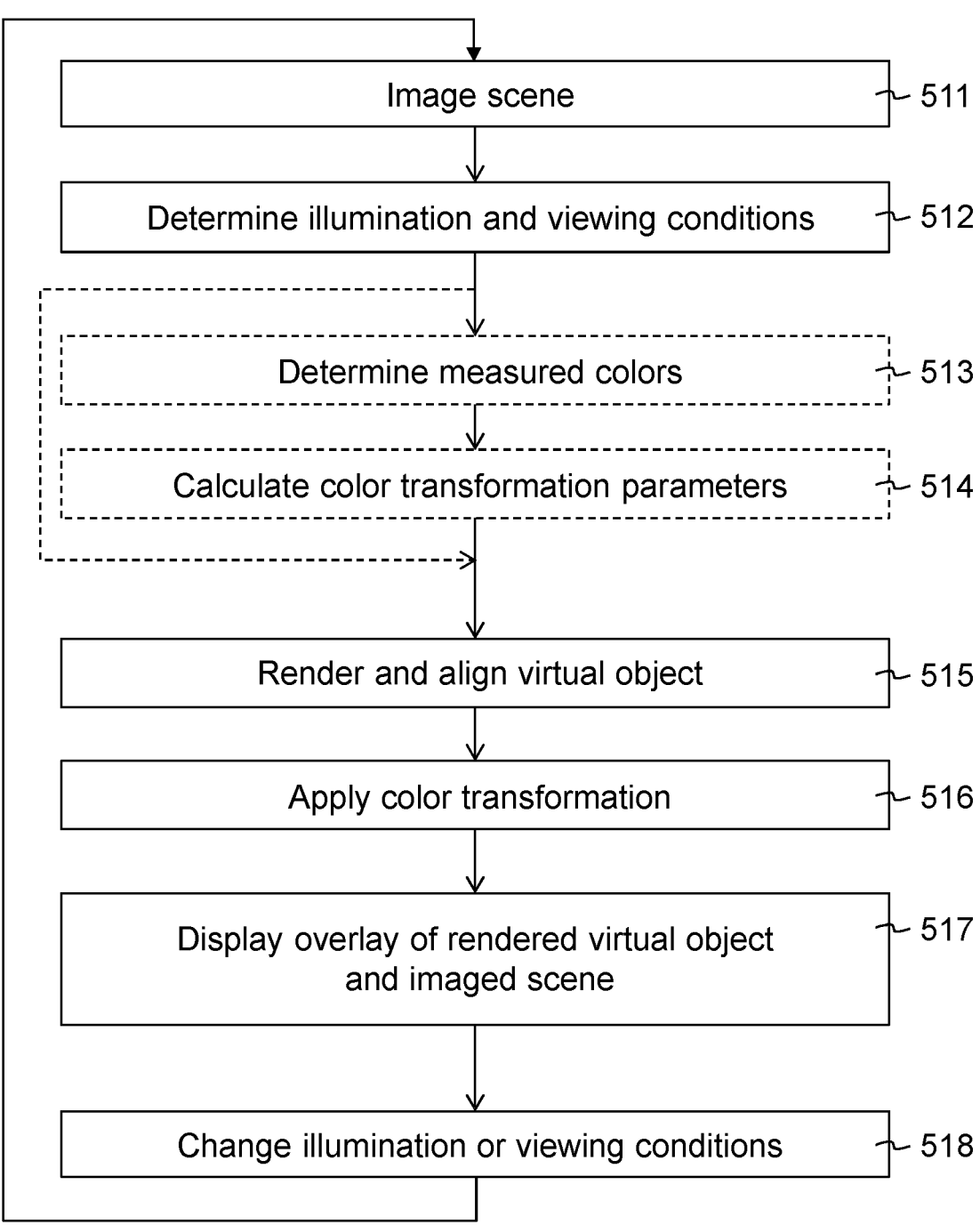
FIG. 4 shows a flow chart illustrating a method for comparing the visual appearance of a real-world sample object to the expected appearance of a virtual object according to a second embodiment.

A preferred embodiment is illustrated in FIG. 4. While not being shown in FIG. 4, steps 501 and 504 of FIG. 3 may initially be carried out as described in conjunction with FIG. 3. Steps 511 to 517 are then carried out at least once. Subsequently, steps 511, 512, 515, 516 and 517 are repeated continuously to create a continuous video stream on the display 220 while the user, in step 518, moves the mobile electronic device 200 around the sample object 110 to continuously change the viewing conditions (arrow M in FIG. 1). In addition, also the illumination conditions may be changed, e.g., by activating and/or moving one or more light sources and/or by rotating the sample object 110.

The user observes the display 220 and compares the visual appearances of the displayed portions of the imaged sample object 110 and the rendered virtual object 140 while the viewing conditions and/or illumination conditions change. The user thus compares the visual appearances of these objects, which are displayed seamlessly together on the display 220, in a highly realistic augmented reality setting, enabling a very reliable prediction of the appearance of the virtual object 140 from different viewing angles and for different illumination conditions, and of how well the appearances of the sample object 110 and the virtual object 140 match.

Steps 513 and 514, i.e., the determination of the measured colors of the color target element 121 and the calculation of the color transformation parameters, do not need to be repeated in every iteration. In principle it suffices to carry out these steps only once. However, it may be advantageous to repeat these steps at least periodically or even in every iteration. For instance, the determined color transformation parameters may slightly change when the illumination conditions and/or viewing conditions change. In some embodiments, color transformation parameters determined for different iterations may be averaged, and the averaged color transformation parameters may be used for applying the color transformation.

Optional Production of Trial Object

If the match is judged to be sufficiently good, optionally an actual trial object may be produced, using the appearance attributes of the virtual object. The actual appearances of the trial object and the sample object may thus be compared in reality. It should be noted that the geometric parameters of the trial object do not necessarily need to correspond to the geometric parameters of the virtual object. For instance, if the trial object is a replacement part for a damaged car, the sample object 110 would be an intact part of the car, and the virtual object would be a model of that intact part. The replacement part, on the other hand, would serve to replace a damaged part of the car, i.e., the geometry of the replacement part (the trial object) would generally be different from the geometry of the sample object. Still, the method of the present disclosure facilitates a reliable prediction whether the appearance of the replacement part will blend well into the appearance of the remaining intact parts of the car.

Modifications

While the invention has been described with reference to preferred embodiments, various modifications are possible without leaving the scope of the present disclosure.

For instance, the color transformation does not necessarily need to be applied to the imaged scene (or to a portion of the imaged scene). In an alternative embodiment, the inverse color transformation may be applied to the virtual object (or to a portion thereof) instead. This may be done before, during or after the rendering process. Applying the inverse color transformation to the virtual object may be particularly advantageous if the camera 210 and the display 220 are calibrated in such a manner that the color impression on the display 220 is reasonably realistic for images taken by the camera 210 while there may be considerable color deviations on the display if device-independent color values are supplied. In still other embodiments, both the imaged scene (or a portion thereof) and the virtual object are subjected to individual color transformations such that in effect the color values of the imaged scene 100 and the rendered virtual object 140 are related to one another through the color transformation that is defined by the color transformation parameters determined in step 507.

If the appearance of the virtual object is to be compared to the appearance of a sample object, the geometry of the virtual object does not need to fully coincide with the geometry of the sample object. It may be sufficient if the displayed surface portion of the virtual object is a continuous continuation of the displayed surface portion of the sample object. While it is advantageous that the displayed surface portion of the virtual object is fully surrounded by the displayed surface portion of the sample object, this is not strictly necessary ether. It may be sufficient if the displayed portions of the virtual object and the sample object meet along a (straight or curved) border line.

While reference has been made to applications in the context of the repair of a vehicle, many other applications of the presently proposed method, system and computer program are possible. For instance, the presently proposed method can also be applied for visualizing new products in a realistic setting before they are actually produced.

The virtual object may comprise one or more materials having a strong texture like fabrics. If such objects are to be compared to a sample object, the target apparatus may comprise texture target elements having characteristic known textures, in addition to plain color target elements, in order to be able to better characterize texture of the sample object. The target apparatus may further comprise filters as disclosed in U.S. Pat. No. 9,823,131.

Many more modifications are possible without leaving the scope of the present disclosure.

LIST OF REFERENCE SIGNS

| | |
|---|---|
| 100 | scene |
| 110 | sample object |
| 120 | target apparatus |
| 121 | color target element |
| 122 | illumination target |
| 123 | alignment marker |
| 200 | mobile electronic device |
| 201 | bus system |
| 210 | camera |
| 220 | display |
| 230 | processor |
| 240 | non-volatile memory |
| 241 | operating system data |
| 242 | program data |
| 243 | calibration data |
| 250 | RAM |
| 260 | communication interface |
| 300 | illuminant |
| 400 | server |
| 410 | database |
| 501-518 | process steps |

The invention claimed is:

1. A method for displaying a virtual object in an imaged scene, the method comprising:
   a) obtaining at least one image of a scene using an imaging device, the scene comprising a target apparatus, the target apparatus comprising a set of color target elements having known reflectance properties and a set of one or more illumination target elements having a plurality of known surface normals relative to the color target elements;
   b) processing the at least one image of the scene to determine illumination and viewing conditions of the scene, using the imaged target apparatus;
   c) processing the at least one image of the scene to determine measured colors for the color target elements;
   d) calculating color transformation parameters based on a comparison of the measured colors and the known reflectance properties of the color target elements, taking into account the determined illumination and viewing conditions;
   e) rendering the virtual object for the determined illumination and viewing conditions;
   f) aligning the rendered virtual object with the at least one image of the scene;
   g) applying a color transformation to the at least one image of the scene without applying the color transformation to the virtual object or applying an inverse color transformation to the virtual object without applying the inverse color transformation to the at least one image of the scene using the calculated color transformation parameters, wherein said color transformation transforms a first set of color attributes into a second set of color attributes such that the colors of the imaged scene and the colors of the rendered virtual object become directly comparable when displayed; and
   h) displaying, on a display device, an overlay of at least a portion of the rendered virtual object with at least a portion of the at least one image of the scene.

2. The method according to claim 1, wherein the scene comprises a sample object, and wherein a non-planar surface portion of the rendered virtual object is displayed adjacent to a non-planar surface portion of the sample object, the non-planar surface portion of the rendered virtual object having a shape that corresponds to a continuous continuation of the non-planar surface portion of the sample object.

3. The method according to claim 2, wherein the target apparatus is located on a surface of the sample object.

4. The method according to claim 1, wherein the displayed portion of the rendered virtual object is displayed on the display device in a position where the target apparatus is located in the at least one image of the scene.

5. The method according to claim 1, comprising:
   j) changing the illumination and/or viewing conditions of the scene; and
   k) repeating at least steps a), b), and e) to g) for the changed illumination conditions and/or viewing conditions.

6. The method according to claim 5, wherein at least steps a), b), and e) to g) are repeated continuously such that the overlay of at least a portion of the rendered virtual object with at least a portion of the at least one image of the scene is displayed on the display device in the form of a continuous video stream, in particular, in real time while the illumination conditions and/or viewing conditions are changed.

7. The method according to claim 1, wherein a mobile electronic device is employed for both imaging and displaying, the mobile electronic device comprising the imaging device and the display device.

8. The method according to claim 1, comprising:
   transmitting metadata that describe a sample object to a server; and
   returning appearance attributes of the virtual object from the server in response to the transmitted metadata.

9. The method of claim 1, wherein the virtual object is rendered in device-independent color values; and
   wherein applying the color transformation to the at least one image of the scene transforms color values that have been determined by the imaging device into corrected color values that are device-independent.

10. The method according to claim 1, wherein the displayed portion of the rendered virtual object is displayed on the display in the position for which the illumination conditions and color transformation parameters have been determined for the at least one image of the scene.

11. A system for displaying a virtual object in an imaged scene, the system comprising:
   a target apparatus, the target apparatus comprising a set of color target elements having known reflectance properties and at least one illumination target element having a plurality of known surface normals;
   an imaging device;
   a display device; and
   a computer system configured to carry out the steps of:
   a) causing the imaging device to obtain at least one image of the scene, the scene comprising the target apparatus;
   b) processing the at least one image of the scene to determine illumination and viewing conditions for the scene;

c) processing the at least one image of the scene to determine measured colors for the color target elements;

d) calculating color transformation parameters based on a comparison of the measured colors and the known reflectance properties of the color target elements, taking into account the determined illumination and viewing conditions;

e) rendering the virtual object for the determined illumination and viewing conditions;

f) aligning the rendered virtual object with the at least one image of the scene;

g) applying a color transformation to the at least one image of the scene without applying the color transformation to the virtual object or applying an inverse color transformation to the virtual object without applying the inverse color transformation to the at least one image of the scene using the calculated color transformation parameters, wherein said color transformation transforms a first set of color attributes into a second set of color attributes such that the colors of the imaged scene and the colors of the rendered virtual object become directly comparable when displayed; and h) causing the display device to display an overlay of at least a portion of the rendered virtual object with at least a portion of the at least one image of the scene.

12. The system according to claim 11, wherein the computer system is configured to cause the display device to display a non-planar surface portion of the rendered virtual object adjacent to a non-planar surface portion of a sample object in the scene, the non-planar surface portion of the rendered virtual object having a shape that corresponds to a continuous continuation of the non-planar surface portion of the sample object.

13. The system according to claim 11, wherein the computer system is configured to cause the display device to display the displayed portion of the rendered virtual object in a position where the target apparatus is located in the at least one image of the scene.

14. The system according to claim 11, wherein the computer system is configured to multiply repeat at least steps a), b), and e) to g).

15. The system according to claim 14, wherein the computer system is configured to repeat at least steps a), b), and e) to g) continuously such that the overlay of at least a portion of the rendered virtual object with at least a portion of the at least one image of the scene is displayed in the form of a continuous video stream, in particular, in real time.

16. The system according to claim 11, comprising a mobile electronic device, the mobile electronic device comprising the imaging device and the display device.

17. A computer program product comprising a non-volatile computer-readable medium on which program instructions are stored, wherein the program instructions which, when executed by at least one processor, cause the at least one processor to carry out the acts of:

a) causing an imaging device to obtain at least one image a scene that comprises a sample object and a target apparatus, the target apparatus comprising a set of color target elements having known reflectance properties and at least one illumination target element having a plurality of known surface normals;

b) processing the at least one image of the scene to determine illumination and viewing conditions for the scene;

c) processing the at least one image of the scene to determine measured colors for the color target elements;

d) calculating color transformation parameters based on a comparison of the measured colors and the known reflectance properties of the color target elements, taking into account the determined illumination and viewing conditions;

e) rendering a virtual object for the determined illumination and viewing conditions;

f) aligning the rendered virtual object with the sample object in the at least one image of the scene;

g) applying a color transformation to the at least one image of the scene without applying the color transformation to the virtual object or applying an inverse color transformation to the virtual object without applying the inverse color transformation to the at least one image of the scene using the calculated color transformation parameters, wherein said color transformation transforms a first set of color attributes into a second set of color attributes such that the colors of the imaged scene and the colors of the rendered virtual object become directly comparable when displayed; and h) causing the display device to display at least a portion of the imaged sample object and at least a portion of the rendered virtual object simultaneously.

\* \* \* \* \*